United States Patent
Doaran et al.

(10) Patent No.: US 9,302,440 B2
(45) Date of Patent: Apr. 5, 2016

(54) TRASH COMPACTOR TROLLEYS AND SYSTEMS FOR USE ON COMMERCIAL AIRCRAFT HAVING MOBILE AND STATIONARY USAGE

(75) Inventors: Van Doaran, Long Beach, CA (US); Thomas Lee, Coto De Casa, CA (US); Sohiel Azizi, Irvine, CA (US); Patricia Granados, Huntington Beach, CA (US); Fred M. Reed, Brea, CA (US); Jeff Felts, Canyon Country, CA (US); Don Nguyen, Fountain Valley, CA (US); David Beach, Garden Grove, CA (US); Graham Howell, Redondo Beach, CA (US)

(73) Assignee: Driessen Aircraft Interior Systems, Inc., Huntington Beach, CA (US)

( * ) Notice: Subject to any disclaimer, the term of this patent is extended or adjusted under 35 U.S.C. 154(b) by 0 days.

(21) Appl. No.: 13/222,001

(22) Filed: Aug. 31, 2011

(65) Prior Publication Data

US 2012/0103206 A1    May 3, 2012

Related U.S. Application Data

(60) Provisional application No. 61/378,407, filed on Aug. 31, 2010.

(51) Int. Cl.
*B30B 1/00* (2006.01)
*B30B 15/00* (2006.01)
(Continued)

(52) U.S. Cl.
CPC .............. *B30B 9/3032* (2013.01); *B30B 9/301* (2013.01); *B30B 9/3042* (2013.01); *B30B 9/3085* (2013.01); *B64D 11/0007* (2013.01); *B64D 11/04* (2013.01); *Y02T 50/46* (2013.01)

(58) Field of Classification Search
CPC .. B30B 9/3032; B30B 9/3067; B30B 9/3053; B30B 9/3042; B30B 9/3064; B30B 9/3007; B30B 1/18; B30B 9/301; Y02T 50/46; B64D 11/04
USPC ............... 100/50, 100, 221, 226, 229 A, 255; 280/47.34, 47.35; 220/495.06, 495.01, 220/908.1, 908; 206/366; 312/291, 326, 312/329; 232/433
See application file for complete search history.

(56) References Cited

U.S. PATENT DOCUMENTS

| 4,719,852 | A | * | 1/1988 | Durbin et al. | ............. 100/229 A |
| 5,024,151 | A | * | 6/1991 | Girardin et al. | ............... 100/349 |

(Continued)

FOREIGN PATENT DOCUMENTS

| DE | 4013107 | | 10/1991 | | |
| DE | 4013107 | A1 * | 10/1991 | ............... | B30B 9/30 |

(Continued)

OTHER PUBLICATIONS

International Preliminary Report on Patentability, including Written Opinion of the International Searching Authority, issued Mar. 5, 2013, in PCT/US2011/049822, 7 pages.

(Continued)

*Primary Examiner* — Shelley Self
*Assistant Examiner* — Onekki Jolly
(74) *Attorney, Agent, or Firm* — Kilpatrick Townsend & Stockton LLP; Dean W. Russell, Esq.; Kristin M. Crall, Esq.

(57) ABSTRACT

Embodiments of the present invention provide a combination trash collection and compaction trolley that has a main front door with a trash door that provides access to an interior of the trolley so that trash can be front-loaded into the trash door, as well as an open top portion, which allows trash to be top-loaded into the open top portion.

18 Claims, 9 Drawing Sheets

(51) Int. Cl.
  *B30B 9/30* (2006.01)
  *B64D 11/00* (2006.01)
  *B64D 11/04* (2006.01)

(56) References Cited

U.S. PATENT DOCUMENTS

| | | | | |
|---|---|---|---|---|
| 5,263,412 A | * | 11/1993 | Chenard et al. | 100/229 A |
| 5,465,660 A | * | 11/1995 | Conti et al. | 100/48 |
| 5,490,455 A | * | 2/1996 | Conti et al. | 100/50 |
| 6,138,558 A | * | 10/2000 | Harrington | 100/102 |
| 6,234,498 B1 | * | 5/2001 | Saku et al. | 280/47.34 |
| 7,174,957 B1 | * | 2/2007 | Jokhio | 166/99 |
| 2006/0283929 A1 | | 12/2006 | Lim | |
| 2011/0259213 A1 | | 10/2011 | Azizi | |

FOREIGN PATENT DOCUMENTS

| | | |
|---|---|---|
| DE | 10250886 | 5/2004 |
| EP | 1449639 | 8/2004 |
| IT | EP 1449639 A2 * | 8/2004 |
| JP | 50033572 | 4/1975 |
| JP | H03114745 | 11/1991 |
| JP | H0724808 | 5/1995 |

OTHER PUBLICATIONS

International Search Report and Written Opinion dated Dec. 8, 2011 in Application No. PCT/US2011/049822.
International Search Report and Written Opinion dated Oct. 10, 2011 in Application No. PCT/US2011/033869.

* cited by examiner

TRASH COMPACTOR TROLLEYS AND SYSTEMS FOR USE ON COMMERCIAL AIRCRAFT HAVING MOBILE AND STATIONARY USAGE

CROSS REFERENCE TO RELATED APPLICATIONS

This application claims the benefit of U.S. Provisional Application Ser. No. 61/378,407, filed Aug. 31, 2010, titled "Trash Compactor for Use on Commercial Aircraft that Offers Mobile and Stationary Trash Collection," the entire contents of which are hereby incorporated by reference.

FIELD OF THE INVENTION

Embodiments of the present invention relate generally to trash compactors and trash compactor systems for use on commercial aircraft that offer mobile or stationary trash collection.

BACKGROUND

Collecting and disposing of trash in confined conditions, particularly on-board a commercial aircraft, can be challenging. A good deal of rubbish is generated on such vehicles, and airline attendants must collect and dispose of this rubbish in an efficient manner. For example, after in-flight beverage service, unused items are collected, which often include drink cups, napkins, newspapers, food wrappers, tea bags, beverage cans, other packaging or non-consumable items and the like, food wastes, or any other type of disposable item that a passenger may consume or bring on-board. Airline attendants typically walk through aisles to collect un-used items and other trash materials. It is desirable to eventually compact all of this trash so that the materials collectively take up less space in the galley area.

The attendants may either push a mobile trolley down the aisle to collect trash or collect trash by hand (e.g., using a hand-held bag and transferring the trash to a compactor in the galley). If a trolley is used, mobile trolleys generally have an opening at the top, into which trash is deposited. One example of a mobile trolley is shown in FIG. 1. This system provides a removable trolley 10 that may be moved into the passenger cabin down the aisles during the trash collection process. One benefit of this system is that trash items are only handled one time—at the point of collection from the passenger, and disposed directly into the top-loading area 12 of the trolley. In the design shown, the trolley is compartmentalized with three bins 14 and allows for in-flight separation of trash items for later recycling. The trolley may also be used as a trash drawer in the galley environment. It may be pulled out of the compaction stand (which remains in the galley compartment at all times), and trash may be top-loaded into one of the trash bins 14. The trolley 10 is then inserted back into the compactor for processing. Mobile trolleys do not have front doors, nor are they intended for front loading of trash. A specialized compactor head is designed that compacts, lifts and moves back to the next bin for its compaction.

Alternatively, the attendants may simply walk down the aisles, carrying a plastic bag or tray to collect trash and un-used items. They then carry this trash back to the galley where it is disposed, which typically involves loading the trash into a stationary compactor unit via a front door that leads to the trash compactor. One example of a stationary trash compactor 16 is shown in FIG. 2. This compactor is a fixed-based unit that remains in the galley compartment at all times in flight. Trash items are brought from the passenger cabin to the galley and compactor. FIG. 2 shows the compactor main door 18 in a open position, but when in use, the main door is closed and a front trash door 20 opens for insertion of trash. Stationary compactors are front-loading units. The trash door load opening is typically approximately 8.5"×8.5". The trash door 20 is generally left open when the unit 16 is not compacting. This makes it convenient for in-flight personnel to load the compactor with items from the passenger cabin or from the galley environment during meal preparation. This compactor's method of collection is conducive to airlines that choose to collect trash items from passengers by hand versus allowing a waste trolley to be moved down the aisles.

There is also a good deal of trash generated in the galley area itself. For example, airline attendants may brew coffee and tea, requiring disposal of used coffee grounds and tea bags. They also may prepare food trays to be served, which may involve removing covering wrappers from the trays. There are also paper products, such a paper towels and napkins used in the galley, that need to be disposed. These items are typically disposed into a stationary trash compactor 16.

Current trash compactors used on-board commercial aircraft support only stationary or only mobile trash collection, but not both. In other words, a mobile unit may be used for collecting trash from passengers in the aisles, which has its own galley stand specifically designed for compacting into a mobile open-top trolley. A stationary compactor is used for collection of trash generated in the galley and elsewhere on-board the aircraft, but stationary compactors are built-into the galley area. They cannot be used for mobile trash collection. (Although stationary trash compactors may have wheels as shown in FIG. 2, they are only for removing and replacing the unit for servicing; stationary compactors are not otherwise designed to be removed from the galley.) It is thus desirable to provide a versatile compaction system, which provides a mobile trolley that can also be used for stationary trash compaction as well. It is further desirable that the trash compactor trolley unit be appropriately sized, and as efficient and light as possible.

BRIEF SUMMARY

Embodiments of the invention described herein provide trash trolleys that support both types of trash collection—with mobile trolley units that are designed to be removed from the galley for mobile trash collection, but that mate with a fixed galley stand. One embodiment described is optimized for stationary use in a galley, although it may be removed for mobile trash collection. Another embodiment is optimized for mobile use, although it may be used as a stationary compaction trolley in the galley as well. Both embodiments mate with one fixed galley mounted stand. This allows the airline catering staff a variety of options for trash collection and compaction. There is thus provided a product with versatility that offers the airlines the ability to align the use of the compactors provided to their specific catering process.

There is thus provided a combination trash collection and compaction trolley that has a main front door with a trash door that provides access to an interior of the trolley trash door so that trash can be front-loaded into the trash door, as well as an open top portion, which allows trash to also be top-loaded into the open top portion.

DETAILED DESCRIPTION

Embodiments of the present invention provide an innovative trash compaction solution for use on commercial aircraft to support the food catering process. The combination trolley units described herein offer new levels of flexibility by incorporating a number of desirable features into a single unit or family of units. The trolleys allow for both mobile collection of trash in the passenger cabin, as well as stationary collection in the galley. The trolleys are further designed to withstand compaction, such that once the trash collection process is complete, compaction may take place in the same trolley, without having to transfer trash.

Figures 1, 2:
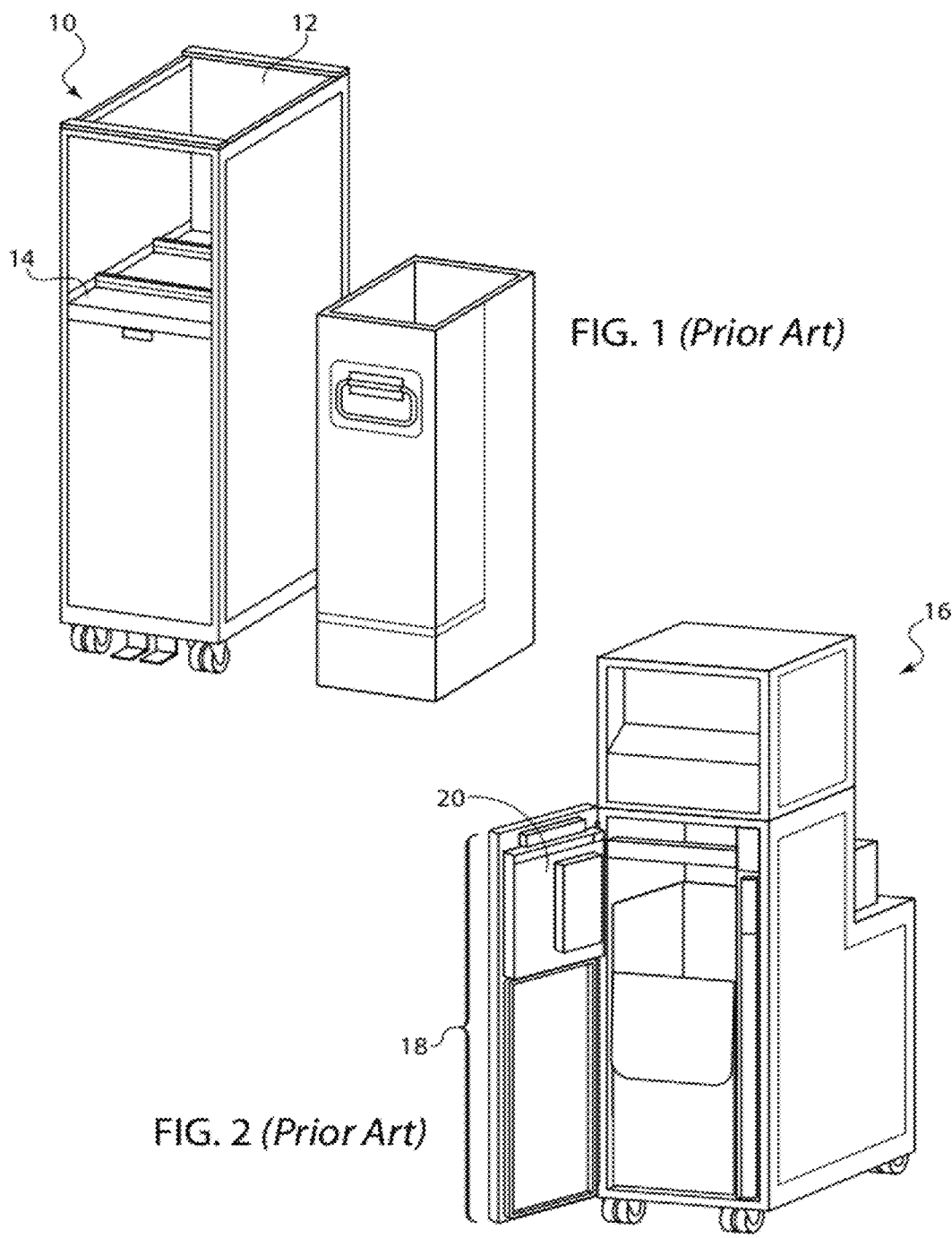
FIG. 1 shows a front perspective view of a prior art mobile trolley for use on board an aircraft.
FIG. 2 shows a front perspective view of a prior art stationary trash compactor unit for use on-board an aircraft.
Figure 3:
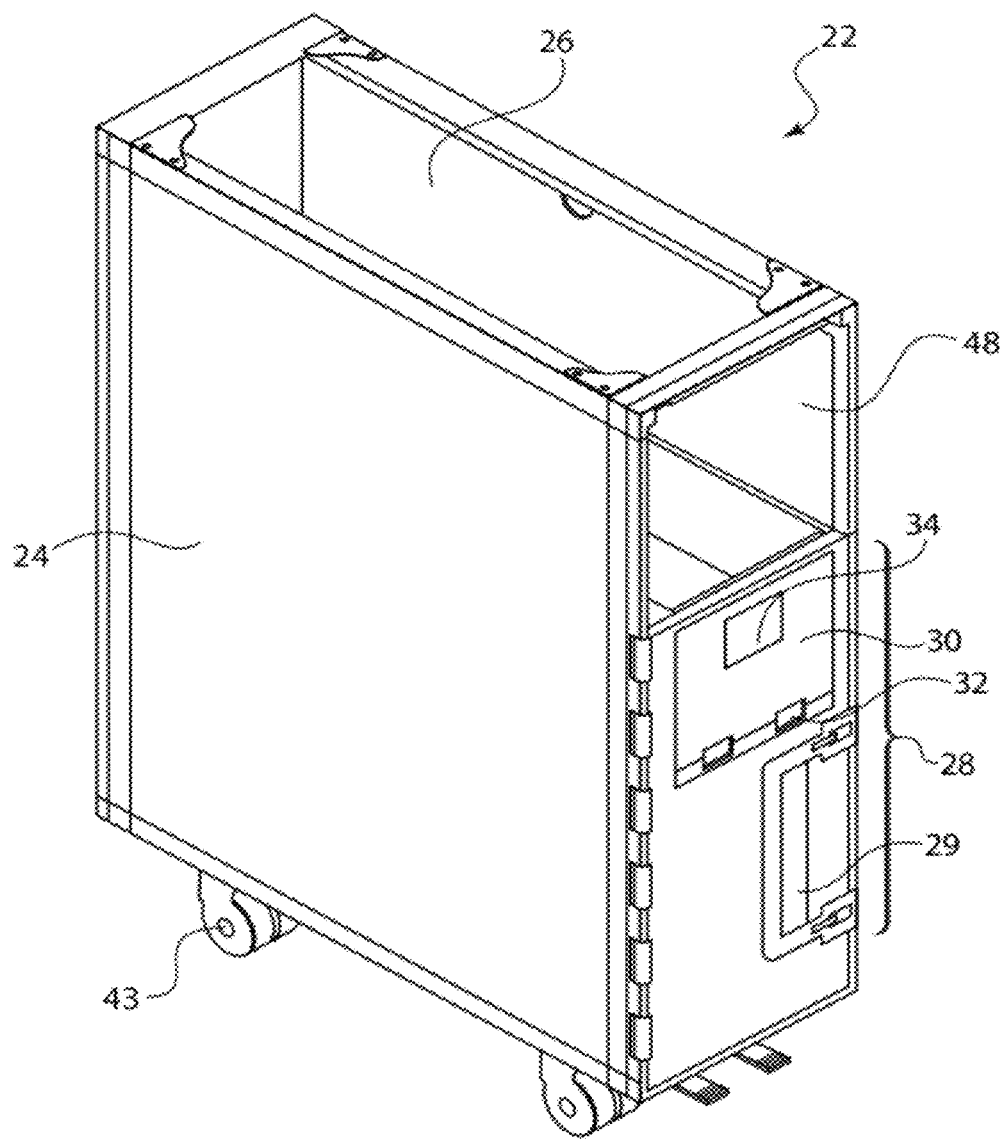
FIG. 3 shows a side perspective view of one embodiment of a combination trolley.
Figure 4:
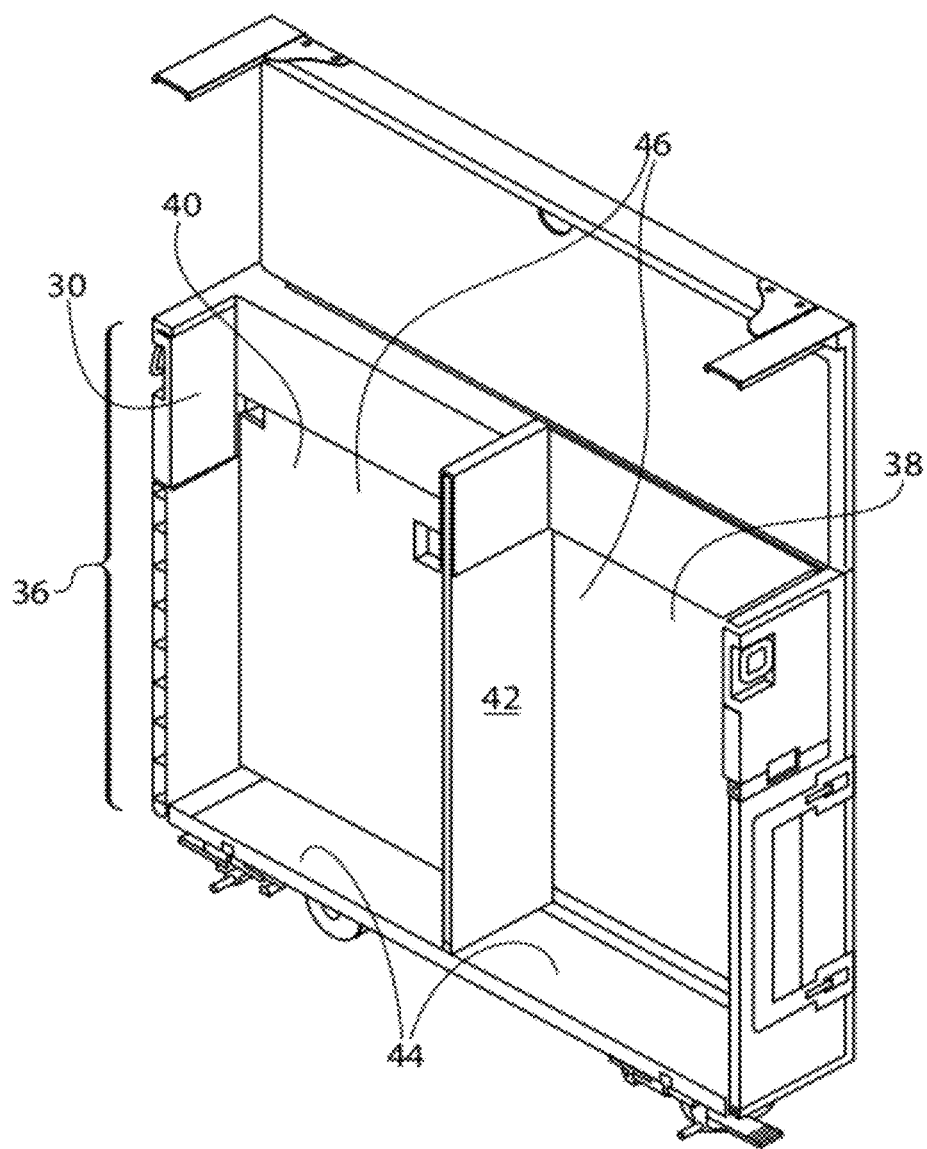
FIG. 4 shows a cut-away view of the combination trolley of FIG. 3.

As shown in FIGS. 3 and 4, one trolley design provides a trolley 22 having a trolley body 24 with an open top portion 26. Open top portion 26 allows for top-loading of trash directly into the trolley body 24. In use, an airline attendant may push trolley 22 through an aisle, collecting trash that is deposited directly into open top portion 26. In addition to top-loading, trolley 22 also allows for front-loading of trash. A main front door 28 with a trash door 30 is provided on a front portion of the trolley 22. Main front door 28 allows access to an interior of the trolley. The main front door 28 has a main door handle 29 and is designed to open completely in order to remove and replace a trash box into the trolley, as well as for cleaning and repair of the trolley. It is generally provided in order to allow access to the trolley body 24 interior. The front door 28 is primarily used to install the trash box, or to change out the box when it is full. In addition, the front door simplifies the trolley cleaning process while on-board the aircraft by permitting access to the compaction chamber. This is beneficial, because without the door, the cleaner would have to lean over the sides to clean the trolley interior and floor. The concept of including a main front door 28 on a mobile trolley enhances the ability to use the trolley in a stationary mode.

This is because the main door 28 further features a trash door 30 (e.g., a trash door or trash window), that creates and provides a path or "chute" into the compactor carton or trash collection chamber. Trash door 30 is a separate door provided on main door that is designed to open for insertion of trash into the trolley. The trash door 30 opens outwardly and downward to allow for trash to be put into the front of the trolley 22 when used as a stationary unit. It is typically provided on a base hinge 32 and has its own handle portion 34 such that door 30 can be released to open outwardly. Trash door 30 may be a hand-operated trash door or window that is operated by gripping a handle portion 34 (which may be an external handle or an internal lip) and applying pressure (e.g., typically a pulling action) to open the trash door 30. Alternate embodiments for trash door 30 are possible, examples of which are shown and described in co-pending application Serial No. 13/094347, titled "Foot Actuated Trash Door For Trash Compactor."

The trash door 30 is ideal for an airline that wants to be able to dispose of small amounts of trash continuously. The trash door 30 can be left open without getting in the way of flight attendants. For larger amounts of trash, the user may want to pull the mobile trolley 22 out (e.g., about one to about two feet) to allow a large amount of trash to be top-loaded into the open top portion 26 at once. (The trolley should then be pushed back in for safety and ease of motion in the galley.) The combination of a main door and a trash door, along with an open top portion has not previously been used on mobile trash collection units before.

FIG. 4 shows a cut-away view of trolley 22 that illustrates the interior of the trolley. At the back of trolley is a second main door 36. Second main door 36 is similar in design to the front main door 28, in that it also has a handle (not shown) and a trash door 30. The interior of the trolley is divided into two chambers 38, 40. The first chamber 38 is bounded by the front main door 28 (in front) and a shared dividing wall 42 (in the back). The second chamber 40 is bounded by the second main door 36 and the shared dividing wall 42. Chambers 38, 40 also share a floor 44 and interior walls 46. Chambers 38, 40 are configured to receive a corrugated trash carton or other trash-containing receptacle.

In this embodiment, both chambers 38, 40 are formed from, lined with, or otherwise reinforced with a material that is sufficient to withstand the forces and abrasion generated by the compaction process. The material should be able to withstand the compressive force of the hydraulic ram. One example of a potential material is a corrosion resistant ("CRES") material. A specific material option may be stainless steel, but it should be understood that any appropriate material that can withstand compaction forces is suitable. For example, the trolley may have CRES (and in a particular embodiment, stainless steel) sheet metal surfaces on the floor 44, interior walls 46, the interior dividing interior wall 42, and both ends of the trolley. Providing a trolley 22 having both internal chambers 38, 40 formed from compaction-strength material allows compaction of trash in both chambers 38, 40. Trolley 22 also has wheels 43, which support its mobile use in the cabin, as well as allow it to be positioned onto the compaction stand, moved into an opposite position on the compaction stand, and removed from the aircraft when necessary.

Figure 7:
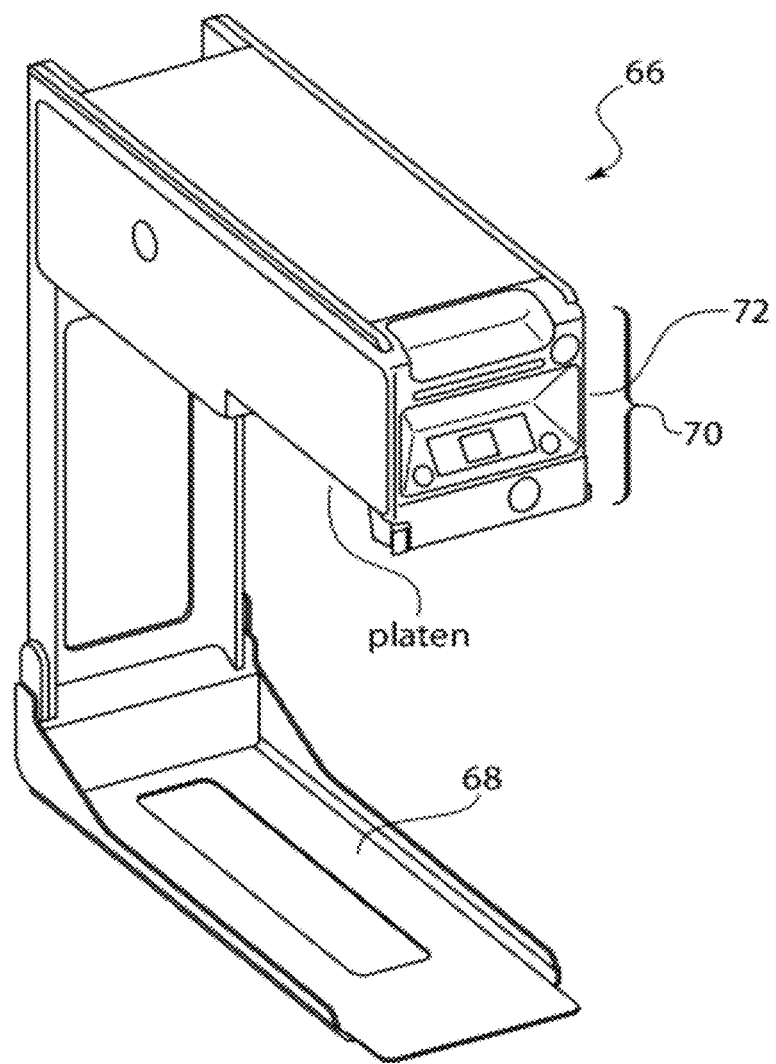
FIG. 7 shows a galley stand for use with a combination trolley without a trolley in place.

In use, after the mobile collection of trash has taken place, the trash-containing receptacle that is positioned in each of the chambers 38, 40 contains trash. The trolley unit 22 may then be installed onto a compaction stand (one example of which is shown in FIG. 7), and a compaction cycle is performed in the first chamber 38. Once that compaction cycle is complete and when a new compaction cycle for chamber 40 is desired, the trolley 22 may be removed from the stand, and rotated around 180 degrees and re-installed so that a second compaction cycle may take place in the second chamber 40. The trolley is then again ready to receive trash. Once the trash cartons contained in compartments 38, 40 are fully compacted, the compacted trash cartons may be removed, new ones positioned, and the trolley is again ready to receive trash.

Figure 8:
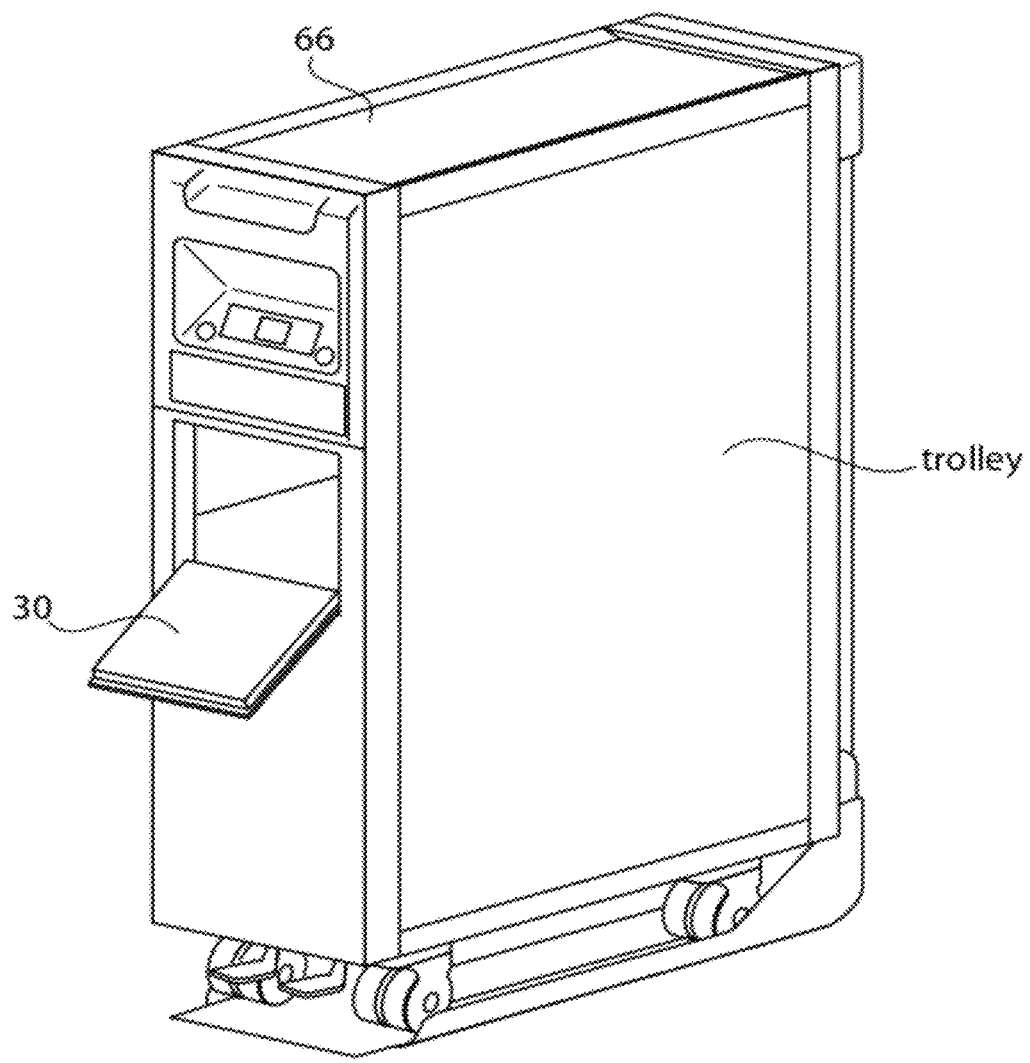
FIG. 8 shows a combination trolley installed on a galley stand.

With the addition of the main door 28 and trash door 30 (as well as open top portion 26), the versatility of the compactor trolley is greatly increased because it is optimized for continuous insertion of small amounts of trash when the trolley is in place on the stand, as well as configured for mobile trash collection and intermittent insertion of large amounts of trash into open top portion 26. Because this trolley 22 has two main doors (front main door 28 and second main door 36), each with a trash door 30, the trolley 22 is configured to receive trash when in the stand, regardless of which side has been compacted last. In other words, if chamber 38 is compacted last, then the trash door 30 of the front main door 28 is accessible. If chamber 40 has been compacted last, then the trash door 30 of the second main door 36 is accessible. (The open portion 48 above each main door 28, 36 is provided in order to accommodate the compaction portion and control face of the stand, as shown in FIGS. 7 and 8 and described further below.)

However, providing both chambers 38, 40 with the capability for compaction comes with a weight penalty due to the additional CRES (or other strong compaction-force resistant) material that is required. In some aircraft, this may not be a concern, but for aircraft that have stricter weight limits or that simply wish for another alternative design that allows stationary and mobile trash collection in a single trolley, a further embodiment of a versatile stationary/mobile trolley is provided.

Figure 5:
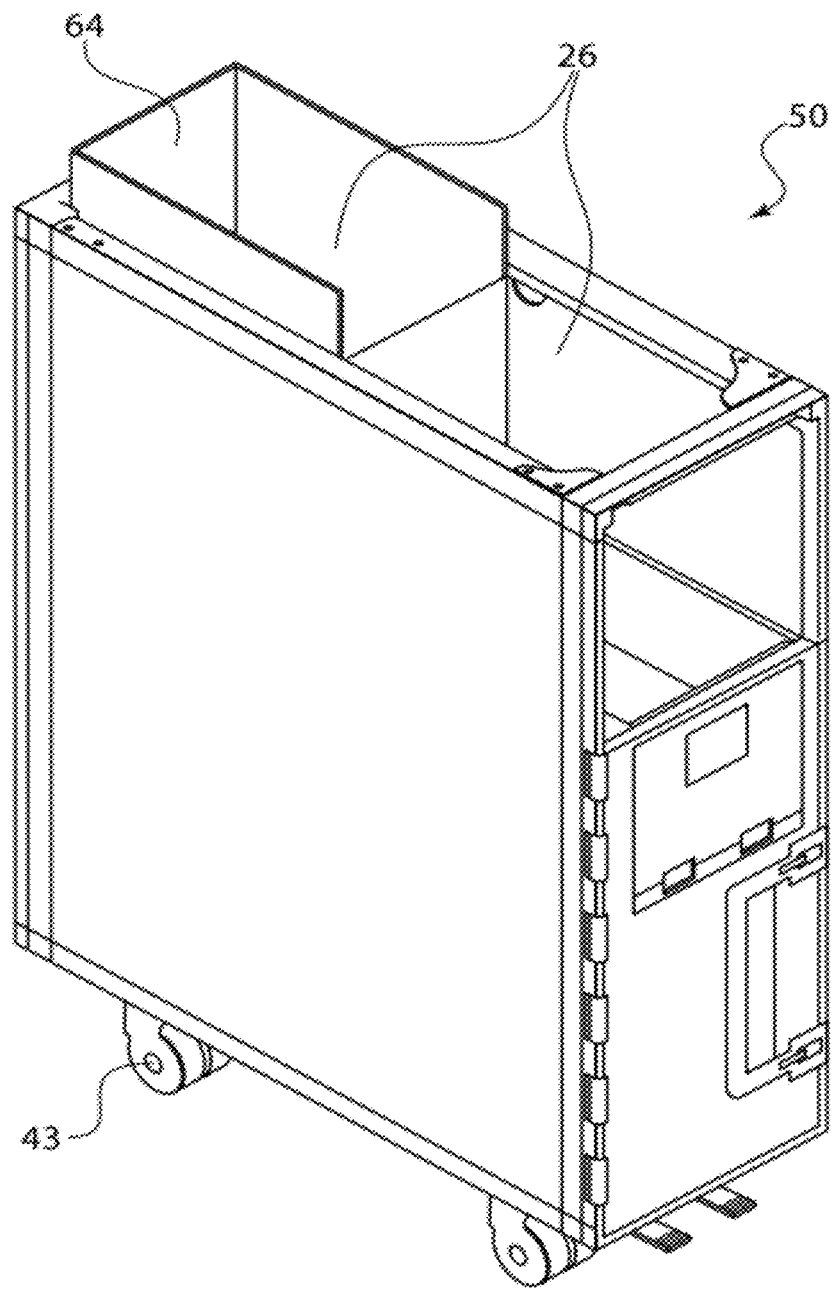
FIG. 5 shows a side perspective view of an alternate combination trolley.
Figure 6:
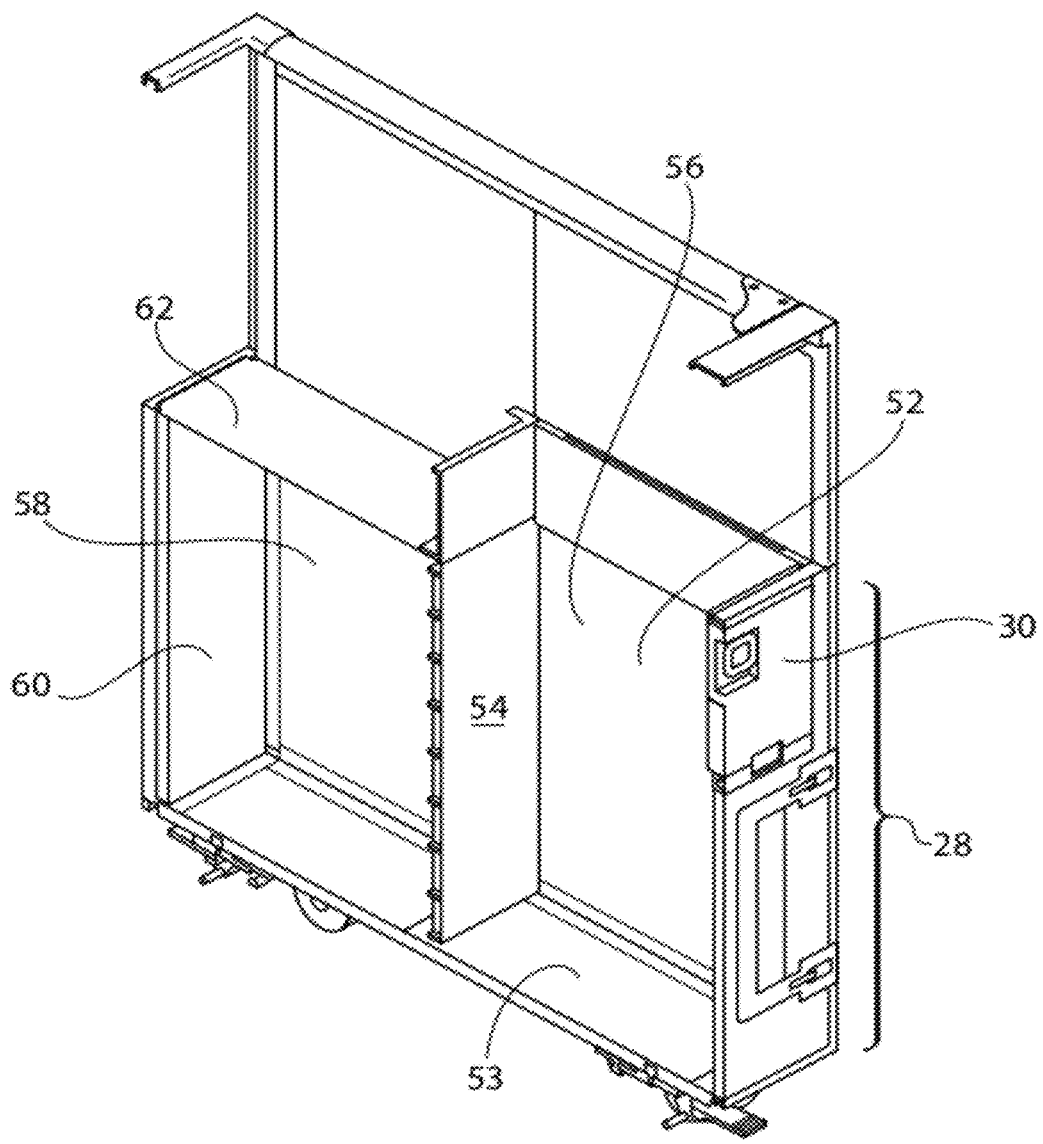
FIG. 6 shows a cut-away view of the combination trolley of FIG. 5.

FIGS. 5 and 6 thus show an alternate trolley 50 design with a single compaction chamber, but that is still optimized for mobile and stationary trash collection. This trolley 50 has a material that can withstand compaction or compressive forces (such as CRES sheet metal surfaces) in only one compaction chamber 52. For example, only the front half of the unit is reinforced with stainless steel sheet metal to withstand the compressive force of the hydraulic ram. This is in anticipation of the unit being used mainly in a stationary mode (and allowing for a significant weight reduction, since the CRES in the second chamber is eliminated), while still allowing the trolley to be used in a mobile mode.

Trolley 50 has a main front door 28, as well as a trash door 30. It also has a compaction chamber 52 formed similarly to the above-described compaction chambers. For example, it may have CRES sheet metal surfaces forming its floor 53, mid-wall or door 54, and side walls 56. Trolley 50 has an open top portion 26, which allows for top-loading of trash. The trash door 30 also allows for traditional front-loading of trash. Trolley 50 also has wheels 43, which support its mobile use, as well as allow it to be positioned on stand or removed from the aircraft when necessary.

However, the second chamber 58 of trolley is not designed for trash compaction. Instead, it provides a storage area for compacted cartons, as well as provides a shelf for supporting a trash carton for mobile trash collection. More specifically, second chamber 58 of trolley is defined by back wall 60, mid-wall 54 and shelf 62. The back wall 60 is not made of a compaction-resistant material, rendering this embodiment of trolley 50 lighter than dual compaction trolley 22. Instead, the back wall 60 may be aluminum or another structurally sound, but not particularly force-resistant, material. For example, back wall 60 may be made of lightweight aluminum honeycomb panels. Shelf 62 is also made of a lightweight material, and it is provided in order for a trash carton 64 to be positioned thereon for mobile trash collection, as shown in FIG. 5.

For mobile use, trash may be collected in a trash carton positioned in chamber 52 as well as a carton 64 positioned on shelf 62, as shown in FIG. 5. The same cardboard box or cartons 64 that are used in the compaction chamber 52 can be stored in the rear compartment 58 once compacted, as well as positioned on top of the rear, lower compartment 58 (on shelf 62). When the trolley 50 is rolled down the aisle for remote trash collection, trash can be separated (paper, plastic, cans, etc) into the two open cartons; one positioned in the lower front (in chamber 52), one positioned in the upper rear (on shelf 62).

After mobile trash collection, the trash carton 64 positioned on the shelf 62 is removed, and the trolley 50 is positioned in the stand. Compaction of trash in the carton positioned in the first chamber 52 is allowed to proceed. The compacted carton may be moved to the rear chamber 58 (or elsewhere) for storage, and then the shelf carton 64 may be inserted into chamber 52, and the compaction cycle is repeated. This trolley design is optimal for stationary use. When in the stationary position, trash is loaded into either the front trash door 30, or the trolley 50 may be partially pulled out, and trash can be loaded into the open top portion 26. After multiple compaction cycles and once the carton in chamber 52 is full, the front main door 28 may be opened, a lever on the mid-wall or door 54 is pulled to open the door, and the full carton is pushed back into chamber 58. Then the mid-wall or door 54 is closed, and a new empty carton may then be installed in chamber 52, rendering the trolley 50 ready for use again, whether stationary or mobile.

The shelf 62 in this trolley offers a few advantages. First, it contains the trash that tends to "springback" out of a compacted box of trash over time. Once a full box of trash is pushed into the rear storage compartment 58, the shelf 62 helps keep springy material, such as plastic bottles, from expanding. A second advantage of shelf 62 is that when the trolley 50 is used for remote trash collection, additional trash containers such as a cardboard carton or box 64 can be set on shelf 62 to collect trash. This may provide collection of a second type of trash, such as aluminum cans, which helps support the need for trash separation and recycling during in-flight catering.

The two different trolleys 22, 50 described may be used with the one stand 66. An example of one stand 66 embodiment is shown in FIG. 7. Stand has a base 68 onto which wheels 43 of a trolley may be rolled. The compaction portion 70 has a control face 72 and a platen (not shown) that is designed to be activated and lowered in order to compress and compact trash in a compaction chamber of the trolley.

One trolley 22 is optimized to support the mobile collection of trash, while the second trolley 50 is optimized for stationary use in the galley area. However, both trolleys are versatile and able to be used for either remote/mobile or stationary trash collection and compaction. Because weight is very important on commercial aircraft, an emphasis on weight reduction may lead an airline to select trolley 50 over trolley 22 because it uses lighter weight material for its second chamber 58. However, if convenience is of particular concern and multiple compaction chambers are desired, then trolley 50 may be selected. Either or both trolleys may be used, and they are intended to be compatible with a single stand 66.

FIG. 8 shows a stand 66 with one of trolley 22 or trolley 50 in place on the stand for stationary trash collection or compaction. Trash door 30 is shown open, and may remain open when the trolley is in place for ease of use.

Figure 9:
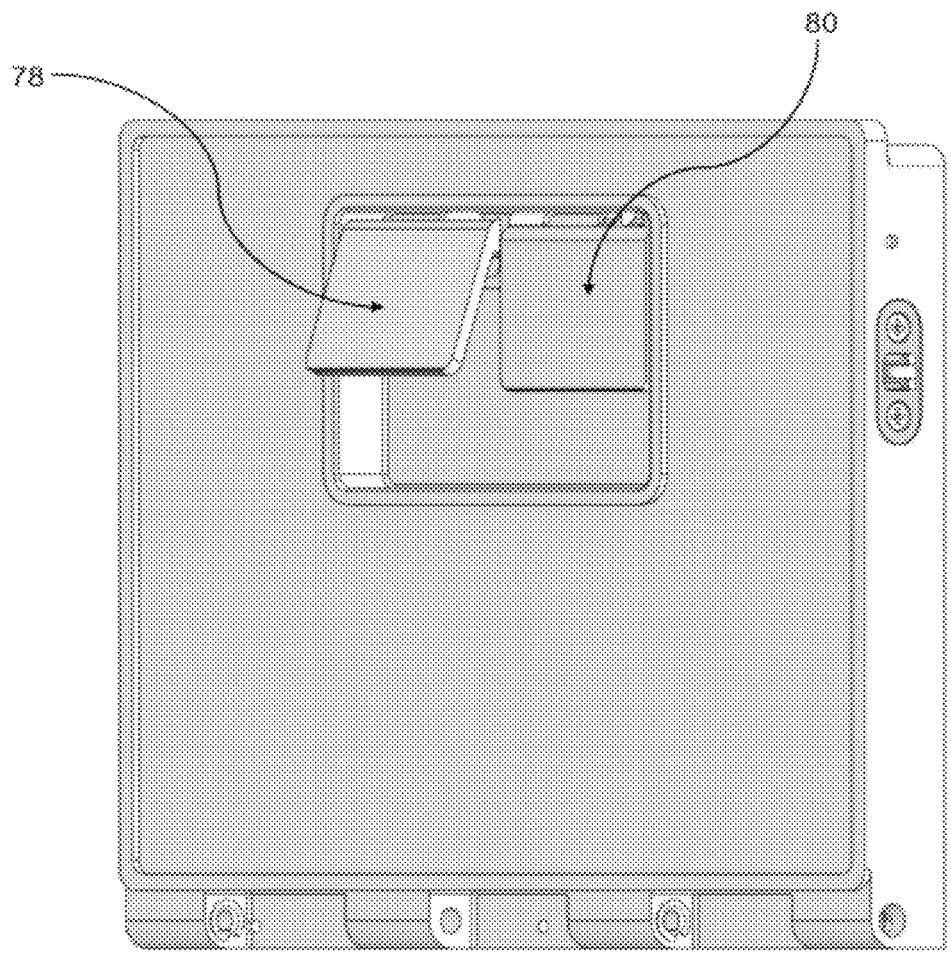
FIG. 9 shows a front perspective view of a trash door having dual independent latches.
Figure 10:
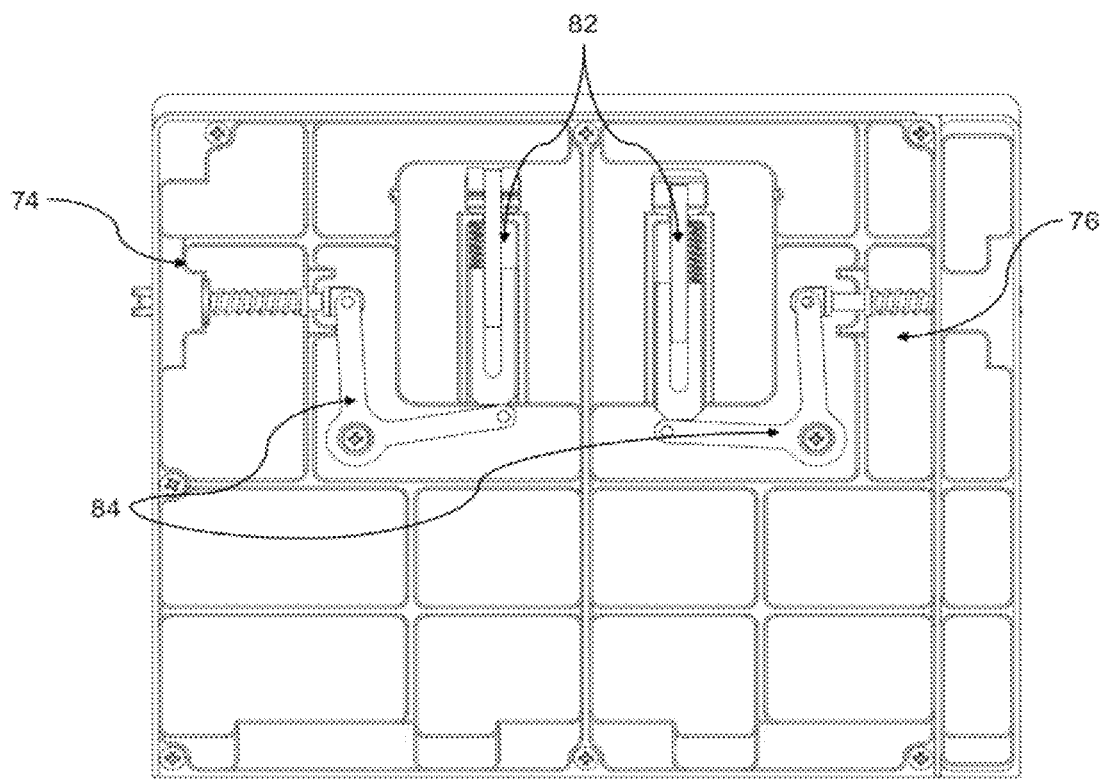
FIG. 10 shows a rear view of a trash door having dual independent latches, one of which is opened and one of which is closed.

In addition to each of trolleys 22, 50 featuring an open top portion 26 as well as a main door 28/trash door 30 in combination, trolleys 22, 50 may also each feature dual independent latches on trash door 30. As shown in FIGS. 9 and 10, latches 74, 76 work independently, such that paddles 78, 80 on the front of trash door 30 must both be raised, released, or otherwise activated in order to open trash door 30. As background, in order to comply with aircraft safety requirements, two latches must be used on each door. This prevents doors in the galley and other locations on the aircraft from unintentionally opening in the event of failure of one of the latches. Historically, this has been accomplished with latches that have to be opened one at a time. For example, many dual latch doors on aircraft include a traditional latch as one securing mechanism and a quarter turn feature as the second securing mechanism. In use, this means that an attendant has to activate the latch with one hand and the quarter turn with the other hand in order to open a door.

The design used on the trolleys described herein use two independent latches that are designed opened at the same time, using only one hand. This allows for the same level of safety while streamlining the process and reducing the cycle time. In one embodiment, the latches 74, 76 may be "pull" latches such that when one the paddles 78, 80 is pulled upwards, an internal bolt 82 is released or retracted in order to allow the door to open. This causes a linkage 84 to pivot and move, allowing clearance for the bolt 82 to disengage. When closed, the latches are spring loaded to engage the trash door frame. FIG. 10 shows one embodiment of such dual independent latches, with one latch 78 in a closed position and the second latch in an open position 80.

Changes and modifications, additions and deletions may be made to the structures and methods recited above and shown in the drawings without departing from the scope or spirit of the invention and the following claims.

What is claimed is:

1. A trash compaction system, comprising a trash compaction stand and a combination trash collection and compaction trolley configured for both mobile and stationary trash collection, the combination trash collection and compaction trolley comprising:
(a) a trolley body comprising first and second chambers, the first and second chambers separated by a shared dividing wall;
(b) the first chamber comprising a compaction chamber and a main front door providing access to the first chamber, the main front door further comprising a separate trash door for providing access to the first chamber when the trolley is positioned on the trash compaction stand in its stationary use;
(c) the second chamber comprising a back wall and shelf dividing the second chamber into a lower storage area accessible via the shared movable dividing wall and an upper trash collection area;
(d) an open top portion spanning both the first and second chambers, the open top portion providing access to the compaction chamber of the first chamber and the upper trash collection area of the second chamber;
(e) an open face above and extending between the main front door of the first chamber and the back wall of the second chamber, the open face for receiving the trash compaction stand when the trolley is positioned on the trash compaction stand;
wherein in use, trash is capable of being top-loaded into the open top portion, front-loaded into the trash door, and loaded into a trash container positioned on the shelf.

2. The trash compaction system of claim 1, wherein the trolley body has wheels and is configured for mobile trash collection.

3. The trash compaction system of claim 2, wherein the trash compaction stand comprises a base, and wherein the trash compaction stand base is configured to receive the trolley, such that the trolley is used for stationary trash collection and compaction.

4. The trash compaction system of claim 1, wherein portions of the interior of the trolley comprise a corrosion resistant steel.

5. The trash compaction system of claim 1, wherein the first chamber is comprised of a material configured to withstand compaction and the second chamber is comprised of a more light-weight, non-compaction resistant material.

6. The trash compaction system of claim 5, wherein the first chamber comprises corrosion resistant steel and wherein the second chamber comprises lightweight aluminum panels.

7. The trash compaction system of claim 5, wherein the lower storage area of the second chamber is configured for storage of compacted or non-compacted trash boxes.

8. The trash compaction system of claim 1, wherein the shared dividing wall can be opened and closed in order to move a trash carton from the first chamber to the second chamber.

9. The trash compaction system of claim 1, wherein the main front door comprises dual independent latches.

10. A method for collecting and compacting trash on board an aircraft, comprising:
providing a trolley configured for both mobile and stationary trash collection, the trolley comprising (i) first and second compaction chambers, the first and second compaction chambers separated by a shared dividing wall, the first and second compaction chambers comprising walls that withstand compaction forces, (ii) a shared open top portion between the first and second compaction chambers, (iii) the first compaction chamber comprising a front main door and a separate trash door, (iv) the second compaction chamber comprising a back main door and a separate trash door, and (v) front and back open faces above the front and back main doors for receiving the compaction stand as the trolley is positioned on the trash compaction stand for compaction and stationary use;
(c) positioning the trolley on the stand and compacting trash in the first compaction chamber;
(d) removing the trolley from the stand and re-positioning the trolley with the second compaction chamber in a compaction position in order for the platen to compact trash in the single vertical plane in the second compaction chamber; and
(e) compacting trash in the second compaction chamber.

11. The method of claim 10, further comprising removing the trolley from the stand for remote mobile collection and collecting trash in the open top portion.

12. The method of claim 10, further comprising loading trash into the separate trash door of either the front main door or the back main door while the trolley remains positioned on the trash compaction stand.

13. The method of claim 10, wherein the trash compaction stand comprises a control face, and wherein the control face of the trash compaction stand is received by the back open face of the trolley and then the front open face of the trolley as the trolley is positioned on the stand for the compaction (c) and wherein the control face of the trash compaction stand is received by the front open face of the trolley and then the back open face of the trolley as the trolley is positioned on the stand for the compaction (e).

14. A trash compaction system, comprising a trash compaction stand and a combination trash collection and compaction trolley configured for both mobile and stationary trash use, the combination trash collection and compaction trolley comprising:
(a) a trolley body consisting of first and second compaction chambers;

(b) the first chamber comprising a compaction chamber and a first main door providing access to the first chamber, wherein the first main door comprises a first separate trash door;

(c) the second chamber comprising a compaction chamber and a second main door providing access to the second chamber, wherein the second main door comprises a second separate trash door;

(d) an open top portion spanning both the first and second chambers, the open top portion providing access to the compaction chamber of the first chamber and to the compaction chamber of the second chamber;

(e) an open portion above and extending between the first main door of the first chamber and the second main door of the second chamber, the open portion configured for accommodating the compaction stand in use;

the compaction stand comprising a compaction platen configured to be lowered in a single vertical compaction plane in order to compact trash along the compaction plane, wherein trash is capable of being top-loaded into the open top portion of either the first or the second chamber when the trolley is in its mobile use and front-loaded into the front trash door or the back trash door when the trolley is in its stationary use, wherein for compaction, the trolley is positioned on the compaction stand with the first chamber aligned with the compaction plane, and after trash in the first chamber has been compacted, the trolley is removed and re-positioned on the compaction stand with the second chamber aligned with the compaction plane.

15. The trash compaction system of claim 14, wherein both the first and second chambers are comprised of a material configured to withstand compaction forces.

16. The trash compaction system of claim 15, wherein the first chamber undergoes a first compaction, and wherein the trolley is removed from the stand and re-positioned for a second compaction in the second chamber.

17. The trolley of claim 14, wherein the first and second chambers comprise walls that withstand compaction forces and that are formed from, lined with, or reinforced with a material that is sufficient to withstand a compaction process from the platen.

18. The trash compaction system of claim 14, wherein the trash compaction stand comprises a control face, and wherein the control face of the trash compaction stand is configured to be received by the open portion above and extending between the first main door of the first chamber and the second main door of the second chamber when the trolley is positioned on the trash compaction stand.

* * * * *